(12) United States Patent
Byrne et al.

(10) Patent No.: US 11,206,077 B2
(45) Date of Patent: Dec. 21, 2021

(54) RADIO FREQUENCY TRANSMISSION IN WORK AREAS

(71) Applicants: Norman R. Byrne, Ada, MI (US); Nickolas J. Morrow, Ada, MI (US)

(72) Inventors: Norman R. Byrne, Ada, MI (US); Nickolas J. Morrow, Ada, MI (US)

(*) Notice: Subject to any disclaimer, the term of this patent is extended or adjusted under 35 U.S.C. 154(b) by 245 days.

(21) Appl. No.: 15/918,580

(22) Filed: Mar. 12, 2018

(65) Prior Publication Data
US 2018/0262262 A1 Sep. 13, 2018

Related U.S. Application Data

(60) Provisional application No. 62/470,424, filed on Mar. 13, 2017.

(51) Int. Cl.
*H04B 7/14* (2006.01)
*H04B 7/145* (2006.01)
*H02J 50/50* (2016.01)
*H02J 50/20* (2016.01)
*H04B 7/15* (2006.01)

(52) U.S. Cl.
CPC .............. *H04B 7/145* (2013.01); *H02J 50/20* (2016.02); *H02J 50/50* (2016.02); *H04B 7/15* (2013.01)

(58) Field of Classification Search
CPC ..... H04B 7/2606; H04B 7/155; H04W 88/04; H04W 16/26; H04W 84/047
See application file for complete search history.

(56) References Cited

U.S. PATENT DOCUMENTS

| | | | | |
|---|---|---|---|---|
| 2004/0229563 A1* | 11/2004 | Fitton | ................... | H04W 16/26 455/7 |
| 2005/0042999 A1* | 2/2005 | Rappaport | ............. | H04B 1/719 455/307 |
| 2012/0113645 A1* | 5/2012 | Liao | ................... | F21V 33/0052 362/253 |
| 2012/0194997 A1* | 8/2012 | McClure | ............... | G06F 1/1698 361/679.55 |
| 2013/0003645 A1* | 1/2013 | Shapira | ............. | H04B 7/15507 370/315 |
| 2013/0322416 A1* | 12/2013 | Son | ........................ | H04W 84/02 370/338 |
| 2015/0048790 A1* | 2/2015 | Rudser | ................ | A61M 60/871 320/108 |
| 2015/0091508 A1* | 4/2015 | Meunier | ................. | B60L 53/65 320/108 |

* cited by examiner

*Primary Examiner* — Siren Wei
(74) *Attorney, Agent, or Firm* — Gardner, Linn, Burkhart & Ondersma LLP (57) ABSTRACT

A power and data housing assembly includes a housing body configured to retain and support an electrical device assembly in the form of a radio frequency (RF) transmitter. The RF transmitter is configured to emit a transmitted RF signal that contains one of data transmissions and power transmissions, and acts as a repeater and/or range-extender or signal redirector for directing wireless power and/or data signals into regions of work areas that otherwise would receive only marginal signals, or none at all.

20 Claims, 7 Drawing Sheets

RADIO FREQUENCY TRANSMISSION IN WORK AREAS

CROSS-REFERENCE TO RELATED APPLICATIONS

The present application claims the filing benefits of U.S. provisional application Ser. No. 62/470,424, filed Mar. 13, 2017, which is hereby incorporated by reference herein in its entirety.

FIELD OF THE INVENTION

The present invention is directed to furniture-integrated power and data units, and more particularly to accessories mounted into the power and data units.

BACKGROUND OF THE INVENTION

Conventional power and data units provide a variety of interconnections and flexibility. Power and data units, with channel or housing elements, may be embedded into walls and integrated into and/or onto furniture, such as office furniture. These embedded and integrated power and data units typically include power outlets and/or data ports arranged into receptacles for mounting into the power and data channel units. Example power outlets and data ports include high voltage AC outlets, low-voltage DC outlets, phone ports, and USB ports, and their respective housing units.

SUMMARY OF THE INVENTION

The present invention provides for a radio frequency (RF) emitter device that broadcasts a low-wattage wireless signal to lengthen or redirect the functional range or reach of wireless base stations that are providing wireless power signals used to power and/or charge personal electronic devices in spaces (e.g., work spaces, personal spaces, and living spaces). Such RF emitter devices help overcome RF barriers that are commonly present in office environments by extending the reach and/or redirecting the signals of the wireless base stations by repeating or mirroring the wireless power signals transmitted by the wireless base stations. In one form of the present invention, an exemplary RF emitter device is coupled to a power and data unit when it is slidably or insertably received within an elongated channel or opening of the power and data unit. The RF emitter assembly may be configured to selectively emit transmitted RF radio signals that include data transmissions and/or power transmissions.

In one form of the present invention, a power and data housing assembly is configured to support at least one electrical device. The power and data housing assembly includes a housing body configured to retain an electrical device assembly. The electrical device assembly is a radio frequency (RF) emitter assembly, which is configured to emit transmitted RF signals containing at least one of data transmissions and power transmissions. The transmitted RF signals may be emitted via one of an external antenna and an embedded antenna of the electrical device assembly.

In another form of the present invention, a method is provided for mirroring/repeating an RF signal received by an electrical device assembly retained and supported by a power and data housing assembly. The method includes receiving an incoming RF signal with the electrical device assembly, the incoming RF signal containing at least one of data transmissions and power transmissions. The method further includes emitting a transmitted RF signal with the electrical device assembly, the transmitted RF signal containing at least one of data transmissions and power transmissions. The transmitted RF signal is selectively based on the incoming RF signal, received by the electrical device assembly, such that the RF signal transmitted by the electrical device assembly selectively repeats the incoming RF signal so that the transmitted RF signal is substantially identical to the incoming RF signal.

The RF emitter assembly includes an RF transmitter configured for transmitting RF signals that contain data transmissions and/or power transmissions. Such transmissions may be controlled in part by a controller. Optionally, the RF emitter assembly further includes an RF receiver configured for receiving RF signals that contain data transmissions and/or power transmissions. The controller may be configured to control the RF transmitter such that the transmitted RF signals mirror or repeat the received RF signals with regards to their data transmissions and/or power transmissions.

In one form of the present invention, the RF emitter assembly is further configured as a base station for origination of data transmissions and/or power transmissions as defined by the controller. Optionally, the (base station) RF emitter assembly is additionally selectably configured as a repeater of received RF signals containing data transmissions and/or power transmissions.

In another form of the present invention, the transmitted RF signals and/or received RF signals may include both data transmissions and power transmissions.

In yet another form of the present invention, the data transmissions may include Wi-Fi data transmissions for Internet access and data transmission (send and receive) via the Internet. The transmitted data is defined at least in part by the controller.

These and other objects, advantages, purposes and features of this invention will become apparent upon review of the following specification in conjunction with the drawings.

DESCRIPTION OF THE PREFERRED EMBODIMENTS

Referring to the drawings and the exemplary embodiments depicted herein, radio frequency (RF) emitter assemblies are adapted to fit into power and data units that may be located in work areas or other locations where wireless power and/or data signals are desired. For example, RF emitter assemblies may be slidably installed in an opening of a power and data channel unit, or insertably installed via individual openings in a power and data housing unit. Such placement of RF emitter assemblies in power and data units installed in work spaces allows for an extended or improved reach of wireless base stations that transmit low-wattage wireless power signals and/or data signals used to power and/or charge (or provide data transmissions to) personal electronic devices in work spaces (or other spaces, such as living spaces and personal spaces, etc.) and may help to overcome many of the RF barriers that are commonly present in office environments. For example, walls or wall dividers that are particularly thick, dense, or made at least partially of metal, as well as other furnishing, may block wireless power and/or data signals emitted by base stations, so that regions of a work area have line-of-sight exposure to base station signals while other regions of the same work area are blocked (or shadowed) from receiving usable signals from the same base station. By placing an RF emitter in a power or data unit at a furniture article in the region of the work area having line-of-sight access to the base station signals, those signals can be redirected and/or amplified to the other regions of the work area by the RF emitter.

Exemplary RF emitter assemblies may be incorporated into a variety of power and data units, including embodiments having housings made of extruded or formed metal. For example, based on the application, external broadcast antennas or antenna relief sections may be required in outer housings of select RF emitter assemblies. Optionally, the RF emitter assembly may function as a stand-alone base station, providing a similar low-wattage wireless power signal to power spaces. Optionally, the RF emitter assembly is configured as a wireless base station that emits transmitted RF signals that include data transmissions providing Wi-Fi transmissions for Internet access and data transmission via the Internet. As discussed herein, the transmitted data is defined at least in part by a controller of the RF emitter assembly. Optionally, the RF emitter assembly may selectively mirror or repeat at least one of data transmissions and electrical power that are contained in received RF signals received by an RF receiver of the RF emitter assembly. With respect to repeating/mirroring data transmissions (such as used in Wi-Fi transmissions), the received RF signals may be received from a wireless base station or a personal electronic device attempting to communicate with the wireless base station.

Figure 1:
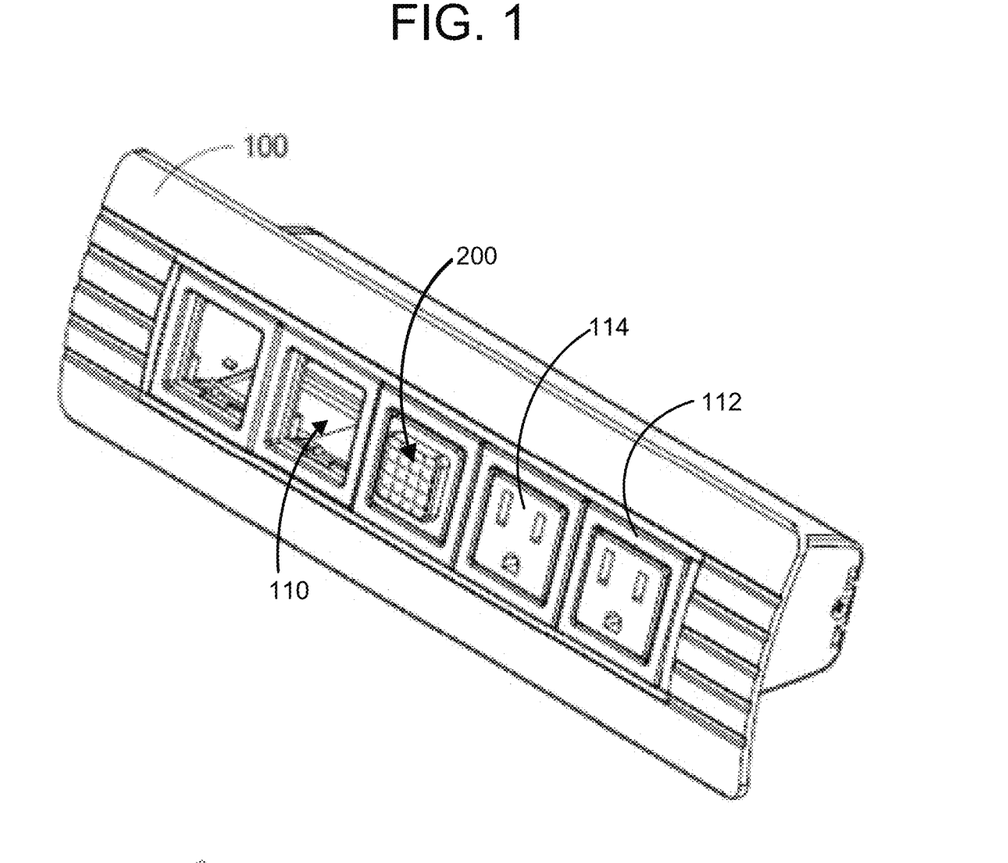
FIG. 1 is an perspective view of an exemplary power and data unit in accordance with an embodiment of the present disclosure.
Figure 2:
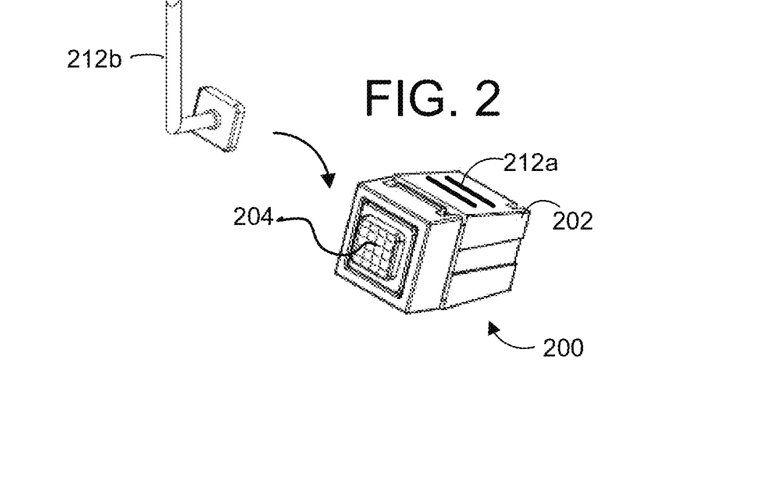
FIG. 2 is an perspective view of an exemplary RF emitter assembly that inserts into an opening of the power and data unit of FIG. 1 in accordance with an embodiment of the present disclosure.

Referring now to FIG. 1, an exemplary extruded power and data unit 100 has five openings 110 for receiving or supporting electrical or electronic power and/or data receptacles or functional modules, or for providing access to an interior of the power and data unit 100. In the illustrated embodiment, two of the openings 110 are empty, two of the openings 110 are filled with power receptacle assemblies (described herein), while the middle opening 110 contains a radio frequency (RF) emitter assembly 200. As illustrated in FIG. 2, and discussed in detail herein, an exemplary RF emitter assembly 200 may include an external antenna 212b or an antenna 212a embedded into the RF emitter assembly housing 202. The RF emitter assembly 200 may contain one or more RF transmitters, a controller, and optionally, RF receivers. Optionally, the RF emitter assembly 200 may also include a faceplate 204 which may include a display to indicate operational status (see FIG. 2). The RF emitter assembly 200 may be configured to receive and/or transmit RF signals including data transmissions and/or power transmissions. As will be described herein, and as is also discussed in detail in commonly owned U.S. Pat. No. 8,480,429 issued to Norman R. Byrne, entitled "Power Data Housing," the disclosure of which is hereby incorporated herein by reference, the power and data unit 100 and other power and data housings provide for what can be characterized as receptacle, electrical component, or electronic device housings. As illustrated in FIG. 1, the openings 110 may also contain receptacle assemblies, such as high-voltage AC outlet receptacles 114 and their housings 112. Additional embodiments for an exemplary power and data housing are disclosed and discussed in detail in commonly owned U.S. Pat. No. 9,312,673 ("the '673 patent") issued to Norman R. Byrne, entitled "Low Voltage Power Receptacle," the disclosure of which is hereby incorporated herein by reference.

Figure 3A:
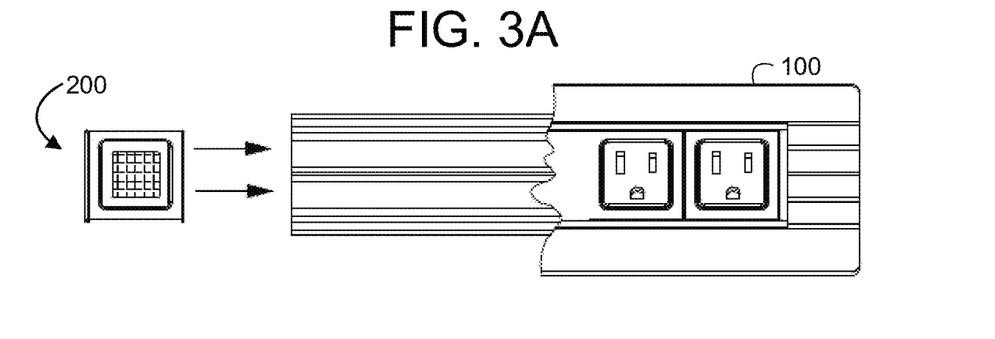
FIGS. 3A, 3B, and 3C illustrate exemplary perspective views of the power and data unit of FIG. 1, with the RF emitter assembly of FIG. 2 insertably or slidably received into the power and data unit in accordance with an embodiment of the present disclosure.
Figure 3B:
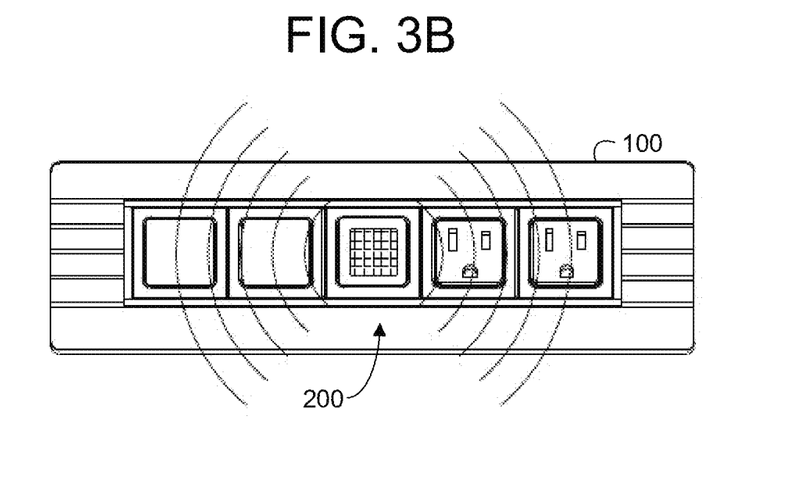
Figure 3C:
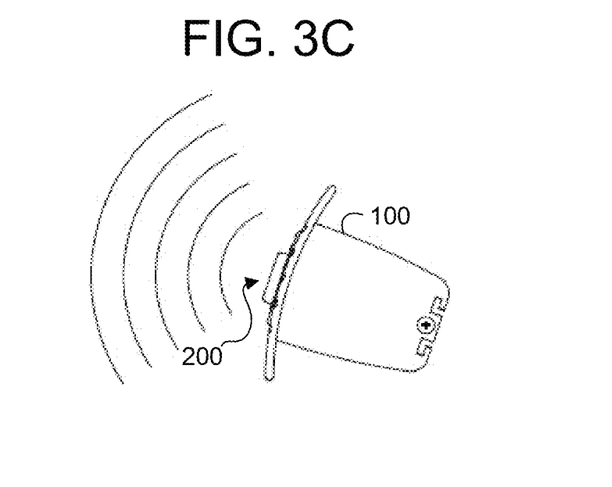

As illustrated in FIGS. 1, 3A, 3B, and 3C, the openings 110 in the power and data unit 100 are also configured to receive electrical devices assemblies, e.g., the RF emitter assembly 200, via their respective housings. As also illustrated in FIG. 3A, the power and data unit 100 may be configured such that the RF emitter assembly 200 may be slidably inserted into the power and data unit 100. As illustrated in FIG. 1, the RF emitter assembly 200 may be insertably received and retained in one of the openings 110 in the power and data unit 100.

Figure 5:
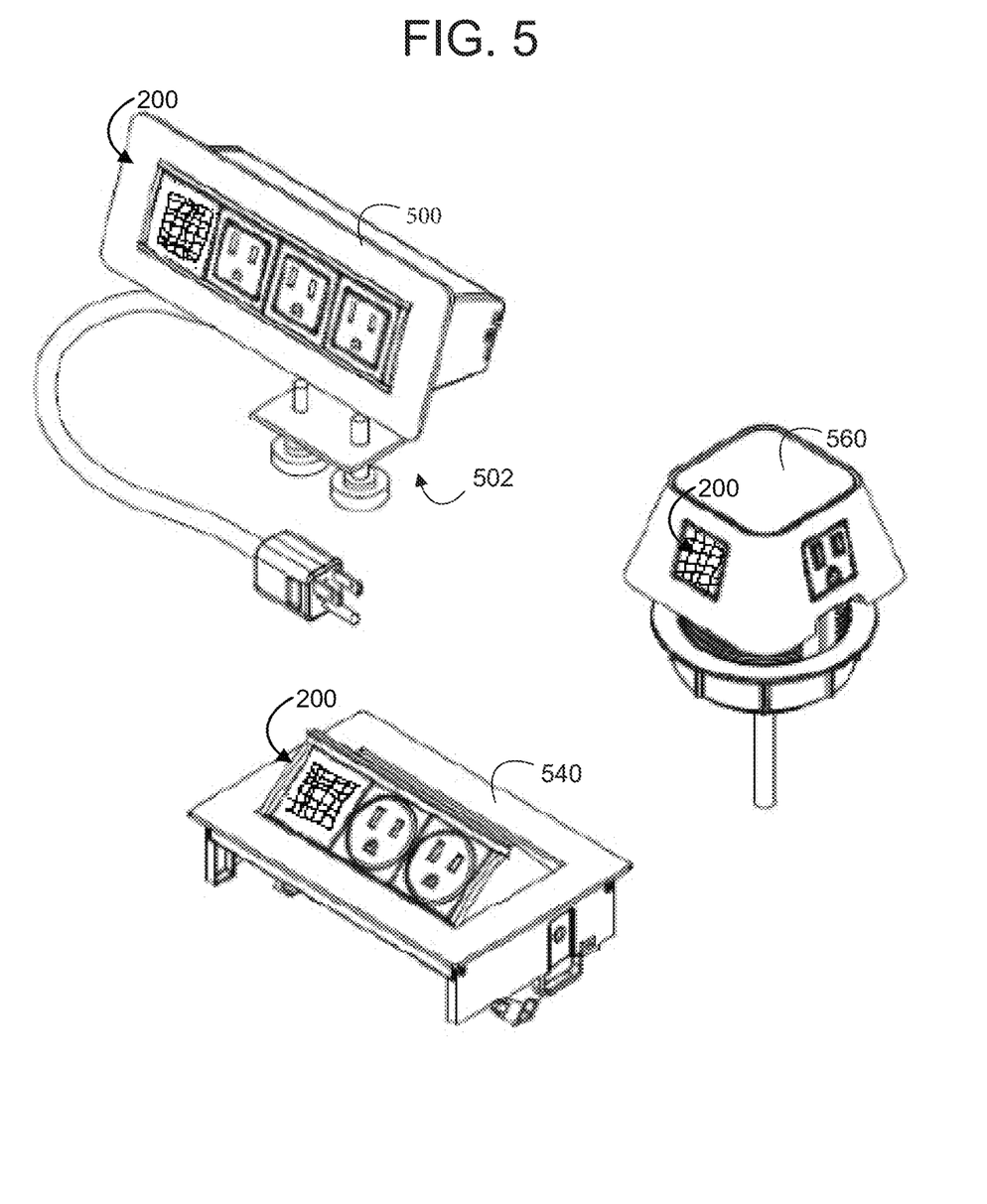
FIG. 5 illustrates exemplary alternative embodiments for the power and data unit in accordance with embodiments of the present disclosure.

As illustrated in FIG. 5, and discussed in the '673 patent, there are several different configurations for a power and data unit 100. An exemplary power and data housing unit 500 may be configured with an edge clamp 502 for attaching to an edge of a table or desk surface. An exemplary power and data housing unit 540 may be configured to be inserted into a horizontal tabletop surface. In another embodiment, an exemplary power and data housing unit 560 is configured as a monument or monument-grommet mount for mounting in a horizontal surface of a work surface and/or tabletop. As illustrated in FIG. 5, exemplary RF emitter assemblies 200 may be inserted into the power and data housing units 500, 540, and 560. As illustrated in FIG. 2, the RF emitter assemblies 200 may utilize external antennas 212b or surface antennas 212a.

Figure 6A:
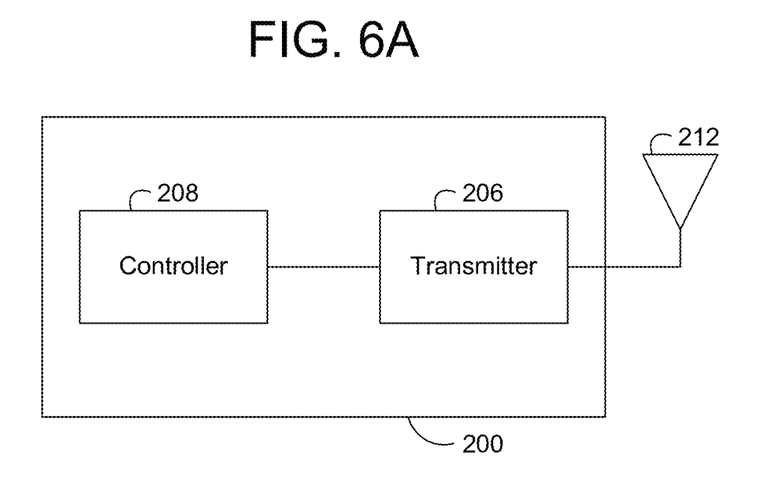
FIGS. 6A and 6B are block diagrams of exemplary RF emitter assemblies in accordance with an embodiment of the present disclosure.
Figure 6B:
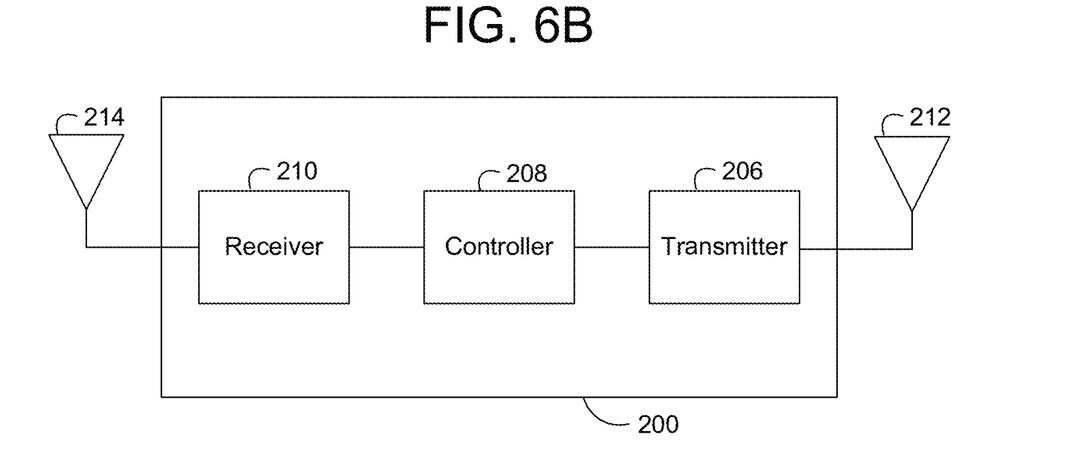
Figure 7A:
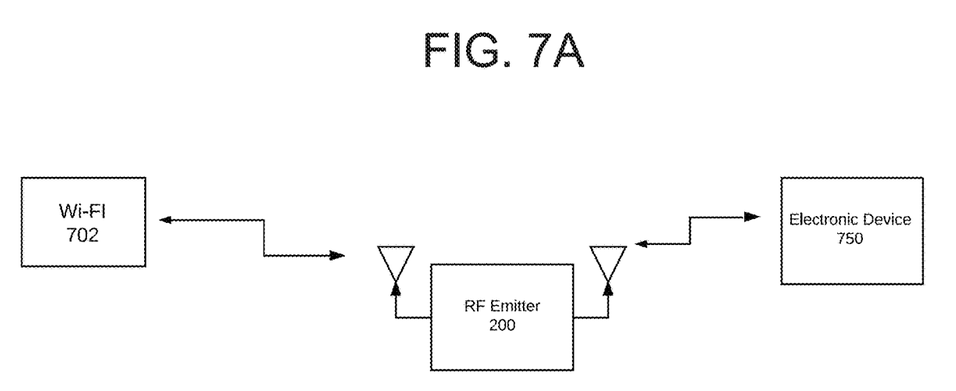
FIGS. 7A and 7B are block diagrams of exemplary RF emitter assemblies used as repeaters in accordance with embodiments of the present disclosure.
Figure 7B:
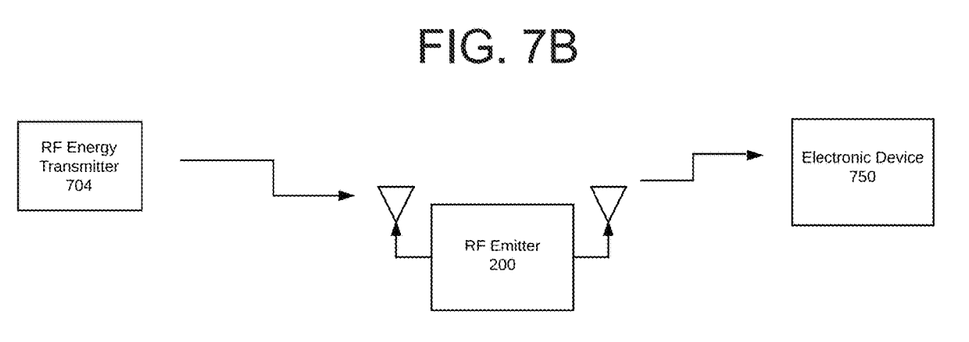

The RF emitter assembly 200 emits transmitted radio frequency (RF) signals that contain one or more of power transmissions and data transmissions. As illustrated in FIG. 7A, data transmissions from an RF emitter assembly 200 may be received by other electrical devices 750 as part of a Wi-Fi wireless data network connecting the electrical device 750 to the Internet (that is, the RF emitter 200 is operating as a Wi-Fi base station). As illustrated in FIG. 7B, power transmissions from the RF emitter assembly 200 may be received by the electrical devices 750 to be used for charging onboard energy storage devices (e.g., batteries or capacitors), or for immediate energy consumption. As illustrated in FIG. 7A, the RF emitter assembly 200 may also receive an RF signal from a Wi-Fi transmitter 702 and subsequently mirror the received data transmission as a Wi-Fi signal repeater. As illustrated in FIG. 7A, the RF emitter 200 is configured to receive and repeat/mirror RF signals transmitted from either a Wi-Fi base unit 702 or an electronic device 750, to be received by the electronic device 750 or the Wi-Fi base unit 702, respectively. As illustrated in FIG. 7B, the RF emitter assembly 200 may also receive an RF signal from an RF power transmitter 704 and subsequently mirror or repeat the received power transmission. As illustrated in FIGS. 6A and 6B, an exemplary controller 208 controls the selection of data contained in the data transmissions, as well as controls the power transmissions transmitted by the RF transmitter 206, while an exemplary RF receiver 210 receives the RF signals received by the RF emitter assembly 200.

Figures 4A, 4B, 4C:
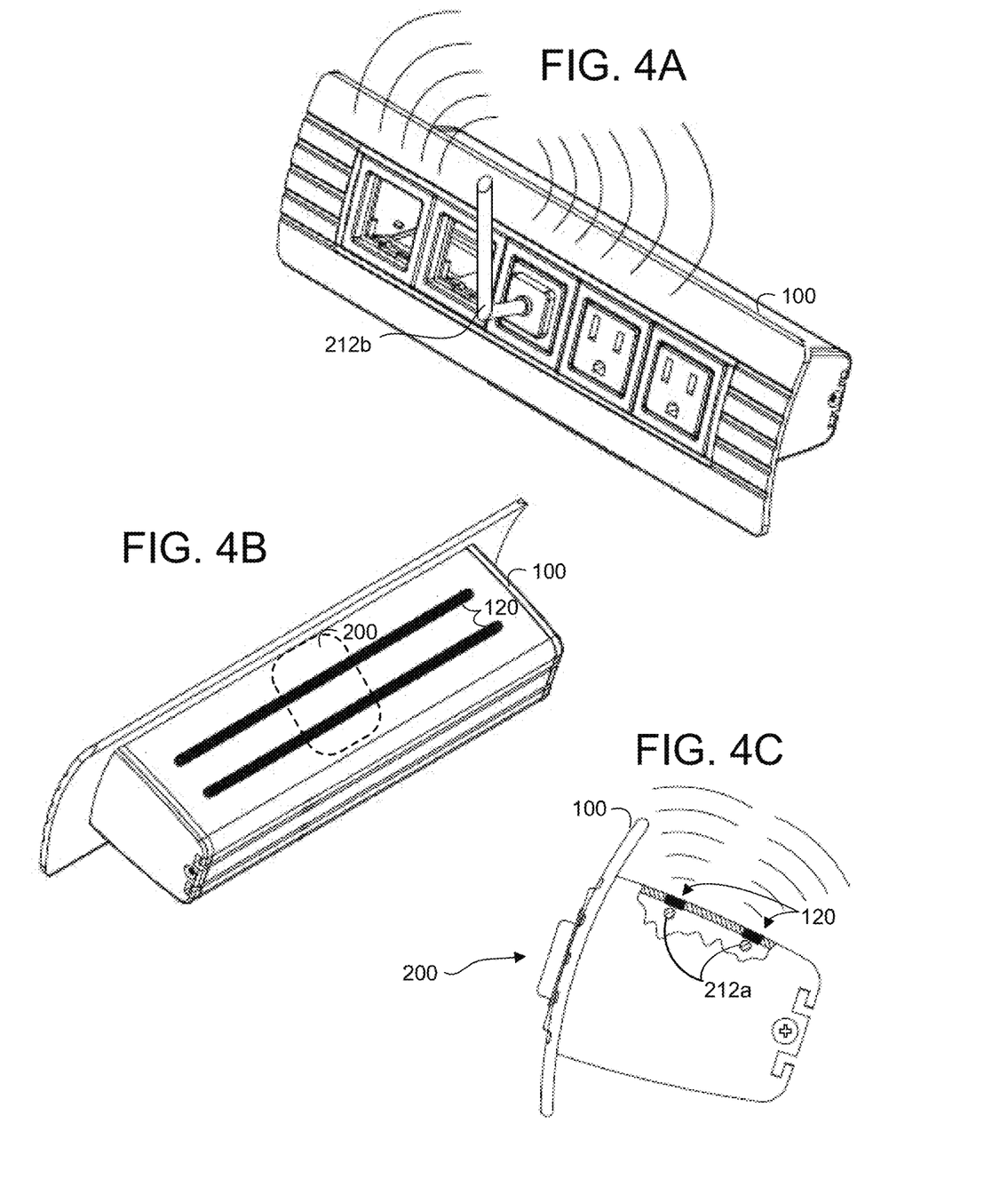
FIGS. 4A, 4B, and 4C illustrate other exemplary perspective views of the power and data unit of FIG. 1, with exemplary RF emitter assemblies including a variety of antennas, such as an external antenna and antenna elements embedded in an RF emitter assembly housing in accordance with an embodiment of the present disclosure.
Figure 8:
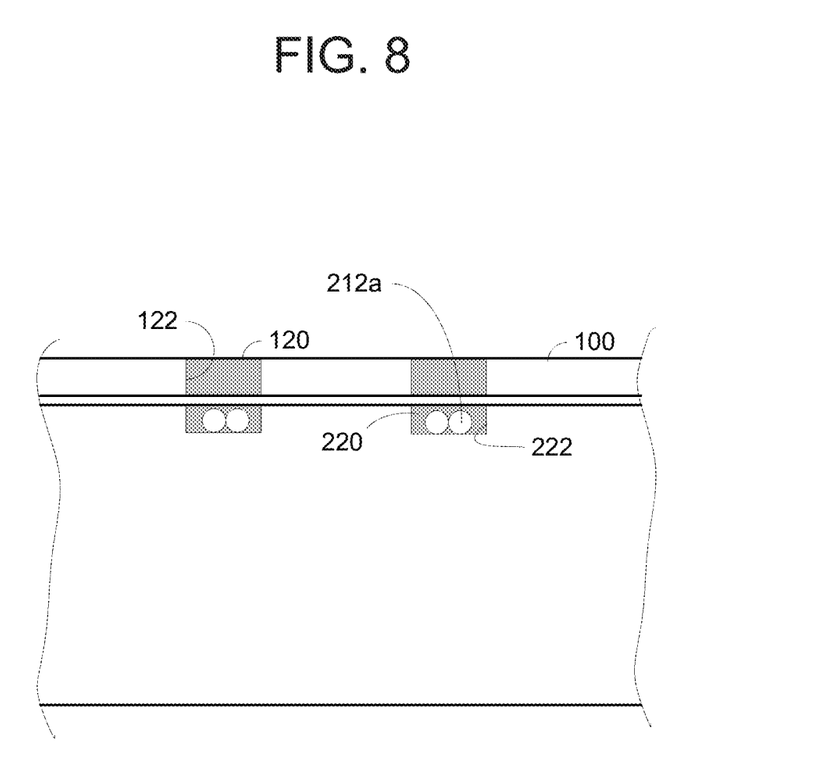
FIG. 8 illustrates a cross-section of a portion of a housing of an exemplary RF emitter assembly inserted into a power and data unit in accordance with an embodiment of the present disclosure.

FIGS. 4A, 4B, and 4C illustrate various antenna options for the RF emitter assembly 200. The RF emitter assembly 200, illustrated in FIG. 4A, has an external antenna 212b that extends from the RF emitter assembly 200. The external antenna 212b is exemplary in nature, other external antenna arrangements are also within the scope of the present invention. As illustrated in FIGS. 4B, 4C, and 8, the power and data unit 100 may also include two RF-permeable portions 120 that fill respective slots or channels 122 in the surface of the power and data unit 100. In an exemplary embodiment, illustrated in FIG. 8, antenna elements 212a of the RF emitter assembly 200 are aligned with the RF-permeable portions 120 of the power and data unit 100 (see also FIGS. 4B and 4C), such that RF signals may be received and/or transmitted by the RF emitter assembly 200 through the RF-impermeable portions 120 of the power and data unit 100. As also illustrated in FIG. 8, channels or slots 222 in the housing 202 (or outer surface) of the RF emitter assembly 200 contain antenna elements 212a that may be covered by RF-permeable portions 220. The RF emitter assembly 200 and the power and data unit 100 in FIG. 8 are not drawn to scale. For the sake of clarity, a gap (not to scale) is illustrated between the RF emitter assembly 200 and the power and data unit 100. The RF emitter assembly 200 may be mounted and retained flush against the housing of the power and data unit 100, or in an alternative arrangement, with a gap between them.

An exemplary electrical device assembly, illustrated in FIGS. 6A and 6B, comprises the RF emitter assembly 200 in a form including an RF transmitter 206 and a controller 208. The RF transmitter 206 is communicatively coupled to an antenna 212. As illustrated in FIG. 6B, the RF emitter assembly 200 may also include an RF receiver 210. The RF receiver 210 receives RF signals from wireless base stations and personal electronic devices. The RF receiver 210 is communicatively coupled to an antenna 214. In one embodiment, the receiver antenna 214 and the transmitter antenna 212 may be a single antenna 212 that is shared by the RF receiver 210 and the RF transmitter 206. In another embodiment, the receiver antenna 214 is a separate antenna. As also illustrated in FIG. 2, the RF emitter assembly 200 may also include a faceplate 204 having a display for indicating device status, as defined by the controller 208. For example, the display may light or illuminate with a particular color to indicate whether the RF emitter 200 is transmitting. Other display schemes are also possible.

It is envisioned that multiple antenna elements may be deployed for specific purposes, such as described below with reference to FIGS. 4B, 4C, and 8. These multiple antenna elements may be housed into a same channel/slot 222 or in respective channels/slots 222. A deployment of multiple antenna elements may be operating in redundancy, separated by channel/slot or frequency, or separated by both channel/slot and frequency. The channels/slots 222 may be slots or grooves that are milled into (but not completely through) a wall material of the RF emitter assembly housing 202, or they could be milled completely through the housing material. If surface-milled without cutting all the way through the housing wall material, a relief hole for cable passage through the housing 202 may be required. If through-milled, a cable passage would most likely not be required. Optionally, or in an alternative arrangement, an add-on or stick-on antenna may also be used.

Thus, the RF transmission system of the present invention provides an RF emitter incorporated into a power and data unit for use in work areas or substantially anywhere that wireless power and/or data are desired. The RF emitter provides for the mirroring or repeating of a low-wattage wireless signal (having power transmission and/or data transmission capabilities) to lengthen or redirect the functional range or reach of a wireless base station used to cover a desired space (e.g., work spaces, personal spaces, and other spaces or environments). Such mirroring or repeating of the wireless signal can be used to overcome RF barriers that are commonly present in office environments.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A power and data housing assembly configured to support at least one electrical device, the power and data housing assembly comprising:
   a housing body configured for mounting to a work surface in a work area;
   a voltage outlet retained and supported by the housing body;
   an electrical device assembly retained and supported by the housing body, the electrical device assembly comprising a radio frequency (RF) transmitter and a controller, wherein said electrical device assembly is configured to selectively function as a Wi-Fi base station;
   wherein said RF transmitter is configured to emit a transmitted RF signal that selectively contains data transmissions and power transmissions; and
   wherein said controller is operable to control said RF transmitter, as defined by a received RF signal, such that said RF transmitter transmits selected data transmissions and selected power transmissions, and wherein said controller is operable to select data for Wi-Fi transmissions.

2. The power and data housing assembly of claim 1, wherein the data transmissions, when transmitted, provide Wi-Fi transmissions for Internet access, and wherein selected data of the data transmissions is defined at least in part by the controller.

3. The power and data housing assembly of claim 1, wherein the power transmissions, when selectively transmitted, provide an energy source for at least one of storage and immediate consumption.

4. The power and data housing assembly of claim 1, wherein said electrical device assembly comprises an RF receiver configured to receive an incoming RF signal, wherein the incoming RF signal is the received RF signal.

5. The power and data housing assembly of claim 4, wherein the incoming RF signal received by said RF receiver contains one of data transmissions and power transmissions.

6. The power and data housing assembly of claim 4, wherein the transmitted RF signal reaches a portion of a room that is blocked to the incoming RF signal.

7. The power and data housing assembly of claim 4, wherein said RF transmitter is configured to repeat the incoming RF signal received by said RF receiver, and wherein the transmitted RF signal is defined by the incoming RF signal, such that the transmitted RF signal selectively repeats data transmissions contained in the incoming RF signal.

8. The power and data housing assembly of claim 1, wherein said electrical device assembly comprises a first antenna communicatively coupled to said RF transmitter.

9. The power and data housing assembly of claim 8, wherein the transmitted RF signal is passed through an RF transparent material imbedded in at least one channel/slot of a housing of the electrical device assembly.

10. The power and data housing assembly of claim 8, wherein said first antenna is configured as an antenna external to said housing body.

11. The power and data housing assembly of claim 8, wherein said first antenna is configured as a plurality of antennas disposed in corresponding channels/slots of a housing of said electrical device assembly.

12. The power and data housing assembly of claim 11, wherein the plurality of antennas are separated by at least one of channel/slot and frequency.

13. A method for mirroring/repeating an RF signal received by an electrical device assembly retained and supported by a power and data housing assembly, wherein the method comprises:
receiving an incoming RF signal with the electrical device assembly, the incoming RF signal containing at least one of data transmissions and power transmissions;
analyzing the incoming RF signal; and
emitting a transmitted RF signal with the electrical device assembly, the transmitted RF signal selectively containing data transmissions and power transmissions, wherein the electrical device assembly selectively functions as a Wi-Fi base station;
selecting data for Wi-Fi transmissions when the electrical device assembly functions as a Wi-Fi base station;
wherein the power and data housing assembly comprises a voltage outlet retained and supported by the power and data housing assembly;
wherein the transmitted RF signal is selectively based on the analyzed incoming RF signal, such that the transmitted RF signal selectively repeats the incoming RF signal, and wherein the transmitted RF signal is defined by the analyzed incoming RF signal, such that the transmitted RF signal contains selected data transmissions and selected power transmissions, and wherein the transmitted RF signal selectively repeats portions of data transmissions contained in the incoming RF signal.

14. The method of claim 13, wherein the data transmissions provide Wi-Fi transmissions for Internet access, and wherein selected data of the data transmissions is defined at least in part by a controller of the electrical device assembly that analyzes the incoming RF signal.

15. The method of claim 13, wherein the power transmissions provide an energy source for at least one of storage and immediate consumption.

16. The method of claim 13, wherein the transmitted RF signal reaches a portion of a room that is blocked to the incoming RF signal.

17. The method of claim 13, wherein emitting a transmitted RF signal with the electrical device assembly comprises the electrical device assembly emitting the transmitted RF signal via an antenna coupled to the electrical device assembly, and wherein the antenna is external to the power and data housing assembly.

18. The method of claim 13, wherein emitting a transmitted RF signal with the electrical device assembly comprises the electrical device assembly emitting the transmitted RF signal through an RF transparent material imbedded in at least one channel/slot of a housing of the electrical device assembly.

19. The method of claim 13, wherein emitting a transmitted RF signal with the electrical device assembly comprises the electrical device assembly emitting the transmitted RF signal via an antenna coupled to the electrical device assembly, and wherein the antenna is configured as a plurality of antennas disposed in corresponding channels/slots of a housing of the electrical device assembly.

20. The method of claim 19, wherein the plurality of antennas are separated by at least one of channel/slot and frequency.

* * * * *